United States Patent
Su et al.

(10) Patent No.: US 11,140,531 B2
(45) Date of Patent: Oct. 5, 2021

(54) SYSTEMS AND METHODS FOR PROCESSING DATA FROM AN ONLINE ON-DEMAND SERVICE PLATFORM

(71) Applicant: BEIJING DIDI INFINITY TECHNOLOGY AND DEVELOPMENT CO., LTD., Beijing (CN)

(72) Inventors: Hong Su, Beijing (CN); Bing Han, Tianjin (CN); Zhangxun Liu, Beijing (CN); Yonghui Cong, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/131,652

(22) Filed: Dec. 22, 2020

(65) Prior Publication Data
US 2021/0112387 A1 Apr. 15, 2021

Related U.S. Application Data

(63) Continuation of application No. PCT/CN2018/119407, filed on Dec. 5, 2018.

(30) Foreign Application Priority Data

Nov. 27, 2018 (CN) .......................... 201811429012.0

(51) Int. Cl.
*H04W 4/40* (2018.01)
*H04W 4/80* (2018.01)
(Continued)

(52) U.S. Cl.
CPC .............. *H04W 4/40* (2018.02); *G06K 9/623* (2013.01); *G06K 9/6256* (2013.01); *G06N 3/08* (2013.01); *H04L 65/4084* (2013.01); *H04W 4/80* (2018.02)

(58) Field of Classification Search
CPC .......... H04W 4/40; H04W 4/80; G06K 9/623; G06K 9/6256; G06N 3/08; H04L 65/4084
See application file for complete search history.

(56) References Cited

U.S. PATENT DOCUMENTS 9,176,710 B2 * 11/2015 Motoki ..................... G06F 8/00
9,491,035 B1 * 11/2016 Pauley ................ G06F 9/45533
(Continued)

FOREIGN PATENT DOCUMENTS

| CN | 106372674 A | 2/2017 |
| CN | 106997577 A | 8/2017 |
| CN | 108650121 A | 10/2018 |

OTHER PUBLICATIONS

International Search Report in PCT/CN2018/110407 dated Aug. 13, 2019, 4 pages.
(Continued)

*Primary Examiner* — Santiago Garcia
(74) *Attorney, Agent, or Firm* — Metis IP LLC

(57) ABSTRACT

A method for processing data from an online on-demand service platform is provided. The method may include obtaining a plurality of first groups of orders from a first time period for an on-demand service provided by the online on-demand service platform. Each group of the plurality of first groups of orders may be associated with a service requester and a plurality of service providers. The method may also include determining a first behavior feature of the plurality of service providers and a second behavior feature of the service requester for each group of the plurality of first groups of orders. The method may also include determining a plurality of training samples based on a plurality of pairs (Continued)

of first behavior features and second behavior features. The method may further include determining feature weights for service evaluation using the plurality of training samples.

20 Claims, 6 Drawing Sheets

(51) Int. Cl.
  *G06K 9/62* (2006.01)
  *G06N 3/08* (2006.01)
  *H04L 29/06* (2006.01)

(56) References Cited

U.S. PATENT DOCUMENTS

| | | | |
|---|---|---|---|
| 2009/0204855 A1* | 8/2009 | Peters | H04N 21/44008 |
| | | | 714/48 |
| 2013/0097578 A1* | 4/2013 | Motoki | G06F 9/5072 |
| | | | 717/101 |
| 2015/0200868 A1* | 7/2015 | Swildens | H04L 47/745 |
| | | | 709/226 |
| 2019/0103095 A1* | 4/2019 | Singaraju | H04L 51/04 |
| 2019/0121566 A1* | 4/2019 | Gold | G06N 3/063 |
| 2019/0289372 A1* | 9/2019 | Merler | G06N 3/04 |
| 2020/0089775 A1* | 3/2020 | Jiang | G06K 9/344 |
| 2020/0090033 A1* | 3/2020 | Ramachandran | G06N 3/08 |

OTHER PUBLICATIONS

Written Opinion in PCT/CN2018/119407 dated Aug. 13, 2019, 5 pages.

* cited by examiner

600

```
┌─────────────────────────────────────────────────────┐
│ Classifying a plurality of pairs of first behavior  │
│ features and second behavior features into a        │
│ plurality of categories, each pair including a      │──610
│ first behavior feature and a corresponding          │
│ second behavior feature corresponding to each       │
│ group of the plurality of first groups of orders    │
└─────────────────────────────────────────────────────┘
                         │
                         ▼
┌─────────────────────────────────────────────────────┐
│ Determining an average first behavior feature       │
│ based on first behavior features in each of the     │──620
│ plurality of categories for the each of the         │
│ plurality of categories                             │
└─────────────────────────────────────────────────────┘
                         │
                         ▼
┌─────────────────────────────────────────────────────┐
│ Determining an average second behavior feature      │
│ based on second behavior features in the each of    │──630
│ the plurality of categories for the each of the     │
│ plurality of categories,                            │
└─────────────────────────────────────────────────────┘
                         │
                         ▼
┌─────────────────────────────────────────────────────┐
│ Determining a plurality of training samples based   │
│ on the average first behavior feature and the       │──640
│ average second behavior feature associated with     │
│ the each of the plurality of categories             │
└─────────────────────────────────────────────────────┘
```

FIG. 6

SYSTEMS AND METHODS FOR PROCESSING DATA FROM AN ONLINE ON-DEMAND SERVICE PLATFORM

CROSS-REFERENCE TO RELATED APPLICATIONS

This application is a continuation of International Application No. PCT/CN2018/119407 filed on Dec. 5, 2018, which claims priority of Chinese Application No. 201811429012.0, filed on Nov. 27, 2018, the entire contents of each of which are hereby incorporated by reference.

TECHNICAL FIELD

The present disclosure generally relates to online on-demand service platforms, and specifically, to systems and methods for processing data from online on-demand platforms.

BACKGROUND

With the development of Internet technology, online on-demand services, or online to offline service, such as online taxi hailing services and delivery services, play a more and more significant role in people's daily lives. The efficiency and/or quality of a service provider in an online on-demand service may be influenced by the behaviors of the service provider during a service session. In some occasions, the efficiency and/or quality of the service provider may be denoted by a service score. The service score of the service provider can be determined based on behavior features and feature weights corresponding to the behavior features. Generally, the feature weights are determined based on empirical values, which may not adapt to different conditions as updates cannot be made very timely. When the service scores of service providers are inaccurate, a number of factors, such as the pairing of service providers with service requestors and the distribution of different orders, can be affected, with unintended consequences.

Thus, it is desirable to provide systems and methods for determining feature weights for service evaluation and performing service evaluations for service providers more effectively and accurately in the online on-demand service platforms.

SUMMARY

According to one aspect of the present disclosure, a system for processing data from an online on-demand service platform is provided. The system may include at least one storage medium including a set of instructions, and at least one processor in communication with the at least one storage medium. When executing the set of instructions, the at least one processor may be directed to cause the system to obtain a plurality of first groups of orders from a first time period for an on-demand service provided by the online on-demand service platform. Each group of the plurality of first groups of orders may be associated with a service requester and a plurality of service providers. For the each group of the plurality of first groups of orders, the at least one processor may also be directed to cause the system to determine a first behavior feature of the plurality of service providers and a second behavior feature of the service requester. The second behavior feature may be defined by a change of behavior related to the on-demand service of the service requester in the first time period with respect to a second time period prior to the first time period. The at least one processor may also be directed to cause the system to determine a plurality of training samples based on a plurality of pairs of first behavior features and second behavior features, each pair corresponding to the each group of the plurality of first groups of orders. The at least one processor may further be directed to cause the system to determine feature weights for service evaluation using the plurality of training samples.

In some embodiments, to determine feature weights for service evaluation, the at least one processor may be directed to cause the system to train a neural network model with the training samples.

In some embodiments, the second behavior feature of the service requester may include at least one of a change of an order quantity associated with the service requester in the first time period with respect to that in the second time period or a change of an order fee associated with the service requester in the first time period with respect to that in the second time period.

In some embodiments, to determine a plurality of training samples based on the plurality of pairs of first behavior features and second behavior features, the at least one processor may further be directed to cause the system to classify each pair of first behavior feature and second behavior feature corresponding to the each group of the plurality of first groups of orders into a plurality of categories; and determine the plurality of training samples based on the plurality of categories.

In some embodiments, to determine the plurality of training samples based on the plurality of categories, the at least one processor may be directed to cause the system to determine an average first behavior feature based on the first behavior feature in the each of the plurality of categories and an average second behavior feature based on the second behavior features in the each of the plurality of categories for each of the plurality of categories. The at least one processor may also be directed to cause the system to determine the plurality of training samples based on the average first behavior feature and the average second behavior feature associated with the each of the plurality of categories.

In some embodiments, to determine the plurality of training samples based on the average first behavior feature and the average second behavior feature associated with the each of the plurality of categories, the at least one processor may further be directed to cause the system to determine a portion of the plurality of categories based on the average second behavior feature associated with the each of the plurality of categories. The average second behavior feature may be associated with each of the portion of the plurality of categories satisfies a condition. The at least one processor may further be directed to cause the system to designate the average first behavior feature and the average second behavior feature associated with the portion of the plurality of categories as the plurality of training samples.

In some embodiments, to determine a portion of the plurality of categories, the at least one processor may further be directed to cause the system to rank the average second behavior feature associated with the each of the plurality of categories. The at least one processor may further be directed to cause the system determine the portion of the plurality of categories based on the ranked average second behavior feature associated with the each of the plurality of categories. The average second behavior feature may be associated with each of the portion of the plurality is greater than a first threshold or less than a second threshold.

In some embodiments, the at least one processor may further be directed to cause the system to obtain a plurality of second groups of orders provided by the online on-demand service platform in a third time period, which is subsequent to the first time period. The at least one processor may further be directed to cause the system to update the plurality of training samples based on the plurality of second groups of orders in the third time period. The at least one processor may further be directed to cause the system to update the feature weights using the updated plurality of training samples.

In some embodiments, the at least one processor may further be directed to cause the system to obtain one or more orders associated with the user from the mobile device. The at least one processor may further be directed to cause the system to identify a third behavior feature of the user based on the one or more orders. The at least one processor may further be directed to cause the system to determine a service score for the user based on the feature weights and the third behavior feature.

According to another aspect of the present disclosure, a system for service evaluation is provided. The system may include a communication port configured to communicate with a mobile device associated with a user, and processing circuits coupled to the communication port. The mobile device may communicate with an online on-demand service platform. During operation, the processing circuits may obtain one or more orders for an on-demand service provided by the online on-demand service platform from a user. The processing circuits may also determine a service score for the user by processing data associated with the one or more orders with a trained neural network model. The neural network may be provided by obtaining a plurality of first groups of orders from a first time period for an on-demand service provided by the online on-demand service platform. Each group of the plurality of first groups of orders may be associated with a service requester and a plurality of service providers. The neural network may also be provided by determining a first behavior feature of the plurality of service providers and a second behavior feature of the service requester for the each group of the plurality of first groups of orders. The second behavior feature may be defined by a change of behavior related to the on-demand service of the service requester in the first time period with respect to a second time period prior to the first time period. The neural network may also be provided by determining a plurality of training samples based on a plurality of pairs of first behavior features and second behavior features, each pair corresponding to the each group of the plurality of first groups of orders. The neural network may further be provided by determining feature weights for service evaluation using the plurality of training samples.

According to another aspect of the present disclosure, a method for processing data from an online on-demand service platform is provided. The method may include obtaining a plurality of first groups of orders from a first time period for an on-demand service provided by the online on-demand service platform. Each group of the plurality of first groups of orders may be associated with a service requester and a plurality of service providers. The method may also include determining a first behavior feature of the plurality of service providers and a second behavior feature of the service requester for the each group of the plurality of first groups of orders. The second behavior feature may be defined by a change of behavior related to the on-demand service of the service requester in the first time period with respect to a second time period prior to the first time period. The method may also include determining a plurality of training samples based on a plurality of pairs of first behavior features and second behavior features, each pair corresponding to the each group of the plurality of first groups of orders. The method may further include determining feature weights for service evaluation using the plurality of training samples.

According to another aspect of the present disclosure, a non-transitory computer-readable storage medium embodying a computer program product. The computer program product including instructions may be configured to cause a computing device to obtain a plurality of first groups of orders from a first time period for an on-demand service provided by the online on-demand service platform. Each group of the plurality of first groups of orders may be associated with a service requester and a plurality of service providers and a second behavior feature of the service requester for the each group of the plurality of first groups of orders. The second behavior feature may be defined by a change of behavior related to the on-demand service of the service requester in the first time period with respect to a second time period prior to the first time period. The computer program product including instructions may be configured to cause the computing device to determine a plurality of training samples based on a plurality of pairs of first behavior features and second behavior features, each pair corresponding to the each group of the plurality of first groups of orders. The computer program product including instructions may further be configured to cause the computing device to determine feature weights for service evaluation using the plurality of training samples.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for determining a plurality of training examples according to some embodiments of the present disclosure.

DETAILED DESCRIPTION

Figure 1:
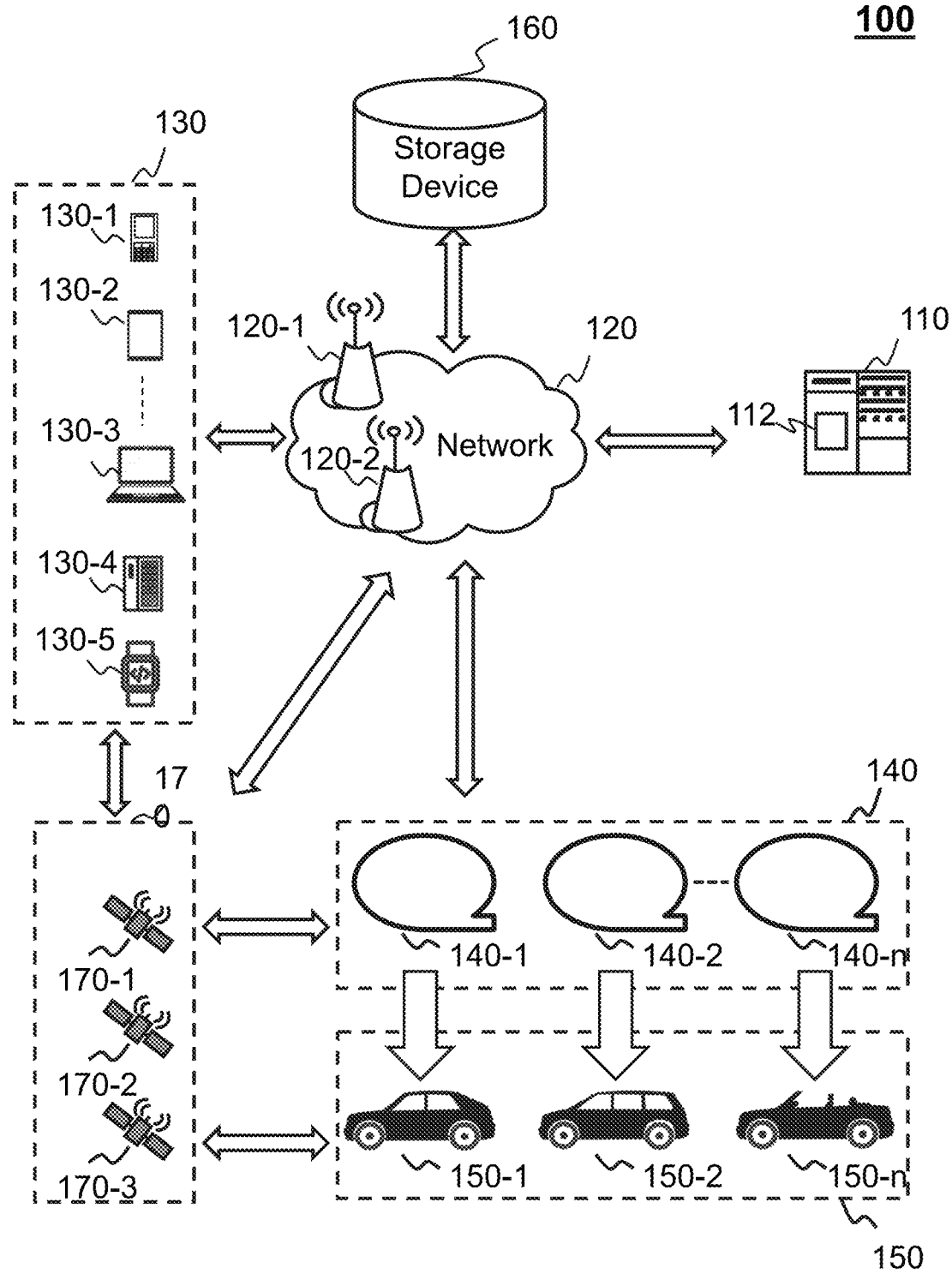
FIG. 1 is a schematic diagram illustrating an exemplary online on-demand service system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express.

The application scenarios of different embodiments of the present disclosure may include but not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar server.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a requester, a passenger, a driver, an operator, or the like, or any combination thereof. In the present disclosure, "requester" and "requester terminal" may be used interchangeably, and "provider" and "provider terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The present disclosure provides systems and methods for processing data from an online on-demand service platform for service evaluation of a service provider in the online on-demand service platform. The systems and methods may map the service quality of the service provider to behavior changes of service requesters associated with the service provider. In particularly, the systems and methods may obtain a plurality of groups of orders from a first time period for the on-demand service from the online on-demand service platform. Each group of the plurality of groups of orders may be associated with a service requester and a plurality of service providers, and the systems and methods may determine a first behavior feature of the plurality of service providers and a second behavior feature of the service requester for the group. The second behavior feature may be defined by a change of behavior related to the on-demand service of the service requester in the first time period with respect to a second time period prior to the first time period. The systems and methods may determine a plurality of training samples based on the first behavior features and the second behavior features for training a neural network model to determine feature weights for service evaluation. After obtaining an order for an on-demand service provided by the online on-demand service platform from a user (e.g., a service provider), the systems and methods may determine a service score for the user based on the feature weights for service evaluation.

FIG. 1 is a block diagram illustrating an exemplary online on-demand service system 100 according to some embodiments of the present disclosure. For example, the online on-demand system 100 may be an online transportation service platform for transportation services. The online on-demand system 100 may include a server 110, a network 120, a requester terminal 130, a provider terminal 140, a vehicle 150, a storage device 160, and a navigation system 170.

The online on-demand system 100 may provide a plurality of services. Exemplary service may include a taxi-hailing service, a chauffeur service, an express car service, a carpool service, a bus service, a driver hire service, and a shuttle service. In some embodiments, the online on-demand service may be any online service, such as booking a meal, shopping, or the like, or any combination thereof.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage device 160 via the network 120. As another example, the server 110 may be directly connected to the requester terminal 130, the provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the service request to perform one or more functions described in the present disclosure. For example, the processing engine 112 may determine a service score of a user based on feature weights for service evaluation and one or more orders for the online on-demand service. As another example, the processing engine 112 may determine the feature weights for service evaluation based on a plurality of groups of orders for an online on-demand service acquired in a time period. As a further example, the processing engine 112 may determine the processing engine 112 may determine a plurality of training samples based on the plurality of groups of orders. The processing engine 112 may determine the feature weights for service evaluation by training a neural network model using the plurality of training samples. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online on-demand system 100 (e.g., the server 110, the requester terminal 130, the provider terminal 140, the vehicle 150, the storage device 160, and the navigation system 170) may transmit information and/or data to other component(s) of the online on-demand system 100 via the network 120. For example, the server 110 may receive a service request from the requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, through which one or more components of the online on-demand system 100 may be connected to the network 120 to exchange data and/or information.

In some embodiments, a passenger may be an owner of the requester terminal 130. In some embodiments, the owner of the requester terminal 130 may be someone other than the passenger. For example, an owner A of the requester terminal 130 may use the requester terminal 130 to transmit a service request for a passenger B or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a service provider D, and/or information or instructions from the server 110. In some embodiments, "passenger" and "passenger terminal" may be used interchangeably, and "service provider" and "provider terminal" may be used interchangeably. In some embodiments, the provider terminal may be associated with one or more service providers (e.g., a night-shift service provider, or a day-shift service provider).

In some embodiments, the requester terminal 130 may include a mobile device 130-1, a tablet computer 130-2, a laptop computer 130-3, a built-in device in a vehicle 130-4, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the built-in device in the vehicle 130-4 may include an onboard computer, an onboard television, etc. In some embodiments, the requester terminal 130 may be a device with positioning technology for locating the position of the passenger and/or the requester terminal 130. In some embodiments, the wearable device 130-5 may include a smart bracelet, a smart footgear, smart glasses, a smart helmet, a smart watch, smart clothing, a smart backpack, a smart accessory, or the like, or any combination thereof.

The provider terminal 140 may include a plurality of provider terminals 140-1, 140-2, . . . , 140-n. In some embodiments, the provider terminal 140 may be similar to, or the same device as the requester terminal 130. In some embodiments, the provider terminal 140 may be customized to be able to implement the on-demand transportation service 100. In some embodiments, the provider terminal 140 may be a device with positioning technology for locating the service provider, the provider terminal 140, and/or a vehicle 150 associated with the provider terminal 140. In some embodiments, the requester terminal 130 and/or the provider terminal 140 may communicate with another positioning device to determine the position of the passenger, the requester terminal 130, the service provider, and/or the provider terminal 140. In some embodiments, the requester terminal 130 and/or the provider terminal 140 may periodically transmit the positioning information to the server 110. In some embodiments, the provider terminal 140 may also periodically transmit the availability status to the server 110. The availability status may indicate whether a vehicle 150 associated with the provider terminal 140 is available to carry a passenger. For example, the requester terminal 130 and/or the provider terminal 140 may transmit the positioning information and the availability status to the server 110 every thirty minutes. As another example, the requester terminal 130 and/or the provider terminal 140 may transmit the positioning information and the availability status to the server 110 each time the user logs into the mobile application associated with the on-demand transportation service 100.

In some embodiments, the provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi-hailing service, a chauffeur service, an express car service, a carpool service, a bus service, a driver hire service, or a shuttle service).

In some embodiments, the provider terminal 140 may send and/or receive information relating to an online on-demand service via a user interface to and/or from the server 110. The user interface may be in the form of an application for the online on-demand service implemented on the provider terminal 140. The user interface may be configured to facilitate communication between the provider terminal 140 and a user (e.g., a driver) associated with provider terminal 140. In some embodiments, the user interface may receive an input of a request for performing a service evaluation from the user through, for example, a user interface screen. The provider terminal 140 may send the request for performing a service evaluation to the server 110 via the user interface. The processing device 112 may determine a service score for the user based on feature weights and one or more orders associated with the user for the online on-demand service.

In some embodiments, the server 110 may transmit one or more signals to the provider terminal 140 via the user interface. The signals may include the service score. The signals may also be configured to cause the provider terminal 140 to display the service score to the user. In some embodiments, the signals may include a query for inquiring whether the service score is acceptable for the user. If the user accepts the service score, the user may input an instruction via the user interface indicating that the service score is acceptable. The provider terminal 140 may transmit the instruction indicating that the service score is acceptable to the server 110. The server 110 may update a previous service score of the user by the service score in response to the instruction indicating that the service score is acceptable. If the user does not accept the service score, the user may input an instruction via the user interface indicating that the service score is not acceptable. In addition, the instruction from the user may also include an inquiry from the user for the reasons for the service score. The provider terminal 140 may transmit the instruction indicating that the service score is not acceptable, as well as the inquiry from the user, to the server 110. In some embodiments, the server 110 may respond to the user's inquiry, via the user interface, by providing a summary for the reasons of the service score.

In some embodiments, the user may input an instruction for inquiring one or more historical service scores in past periods, for example, the past week, the past month, etc., via the user interface. The provider terminal 140 may transmit the instruction for inquiring one or more historical service scores in past periods to the server 110. The server 110 may transmit one or more signals including the one or more historical service scores to the provider terminal 140 via the user interface. The one or more signals including the one or more historical service scores may be configured to cause the provider terminal 140 display the one or more historical service scores to the user.

In some embodiments, the user may input an instruction for inquiring, such as the rank of the service score, the factors that cause the service score to decrease, etc., via the user interface. The provider terminal 140 may transmit the instruction for inquiring, such as the rank of the service score, the factors that cause the service score to decrease, etc., to the server 110. The server 110 may transmit one or more signals including response to the inquiries to the provider terminal 140 via the user interface. The one or more signals may be configured to cause the provider terminal 140 to display the rank of the service score, the factors that cause the service score to decrease, etc., to the user.

The storage device 160 may store data and/or instructions. For example, the storage device 160 may store a plurality of orders acquired by an online on-demand platform in a time period. As another example, the storage device 160 may store feature weight for service evaluation. In some embodiments, the storage device 160 may store data obtained from the requester terminal 130 and/or the provider terminal 140. In some embodiments, the storage device 160 may store data and/or instructions that the server 110 may execute or use to perform exemplary methods described in the present disclosure. In some embodiments, storage device 160 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components of the online on-demand system 100 (e.g., the server 110, the requester terminal 130, or the provider terminal 140). One or more components of the online on-demand system 100 may access the data or instructions stored in the storage device 160 via the network 120. In some embodiments, the storage device 160 may be directly connected to or communicate with one or more components of the online on-demand system 100 (e.g., the server 110, the requester terminal 130, the provider terminal 140). In some embodiments, the storage device 160 may be part of the server 110.

The navigation system 170 may determine information associated with an object, for example, one or more of the requester terminal 130, the provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may transmit the information mentioned above to the network 120, the requester terminal 130, the provider terminal 140, or the vehicle 150 via wireless connections.

In some embodiments, one or more components of the online on-demand system 100 (e.g., the server 110, the requester terminal 130, the provider terminal 140) may have permissions to access the storage device 160. In some embodiments, one or more components of the online on-demand system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

One of ordinary skill in the art would understand that when an element (or component) of the online on-demand system 100 performs, the element may perform through electrical signals and/or electromagnetic signals. For example, when a requester terminal 130 transmits out a service request to the server 110, a processor of the requester terminal 130 may generate an electrical signal encoding the request. The processor of the requester terminal 130 may then transmit the electrical signal to an output port. If the requester terminal 130 communicates with the server 110 via a wired network, the output port may be physically connected to a cable, which further may transmit the electrical signal to an input port of the server 110. If the requester terminal 130 communicates with the server 110 via a wireless network, the output port of the requester terminal 130 may be one or more antennas, which convert the electrical signal to electromagnetic signal. Similarly, a provider terminal 130 may receive an instruction and/or service request from the server 110 via electrical signal or electromagnet signals. Within an electronic device, such as the requester terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device.

Here, an electrical signal may refer to one electrical signal, a series of electrical signals, and/or a plurality of discrete electrical signals.

Figure 2:
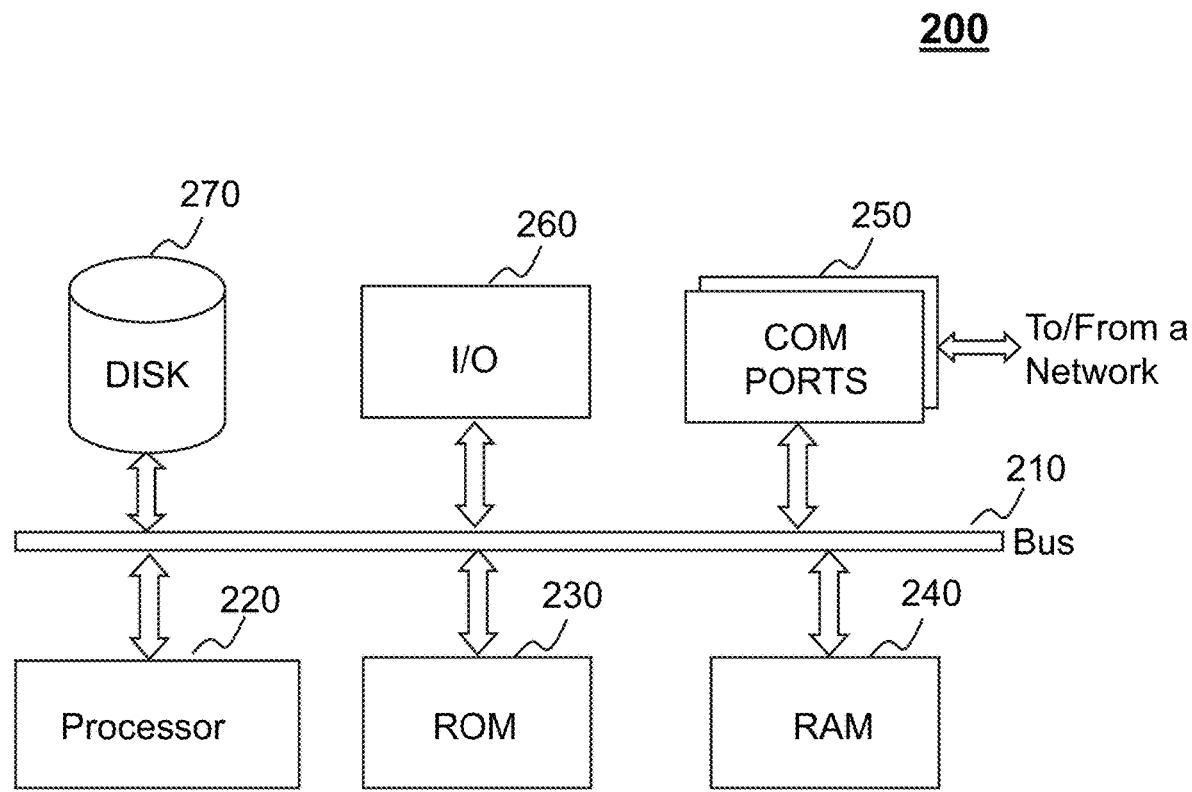
FIG. 2 is a schematic diagram illustrating exemplary hardware and software components of a computing device according to some embodiments of the present disclosure.

FIG. 2 illustrates a schematic diagram of an exemplary computing device according to some embodiments of the present disclosure. The computing device may be a computer, such as the server 110 in FIG. 1 and/or a computer with specific functions, configured to implement any particular system according to some embodiments of the present disclosure. Computing device 200 may be configured to implement any components that perform one or more functions disclosed in the present disclosure. For example, the server 110 may be implemented in hardware devices, software programs, firmware, or any combination thereof of a computer like computing device 200. For brevity, FIG. 2 depicts only one computing device. In some embodiments, the functions of the computing device may be implemented by a group of similar platforms in a distributed mode to disperse the processing load of the system.

The computing device 200 may include a communication terminal 250 that may connect with a network that may implement the data communication. The computing device 200 may also include a processor 220 that is configured to execute instructions and includes one or more processors. The schematic computer platform may include an internal communication bus 210, different types of program storage units and data storage units (e.g., a hard disk 270, a read-only memory (ROM) 230, a random-access memory (RAM) 240), various data files applicable to computer processing and/or communication, and some program instructions executed possibly by the processor 220. The computing device 200 may also include an I/O device 260 that may support the input and output of data flows between computing device 200 and other components. Moreover, the computing device 200 may receive programs and data via the communication network.

Figure 3:
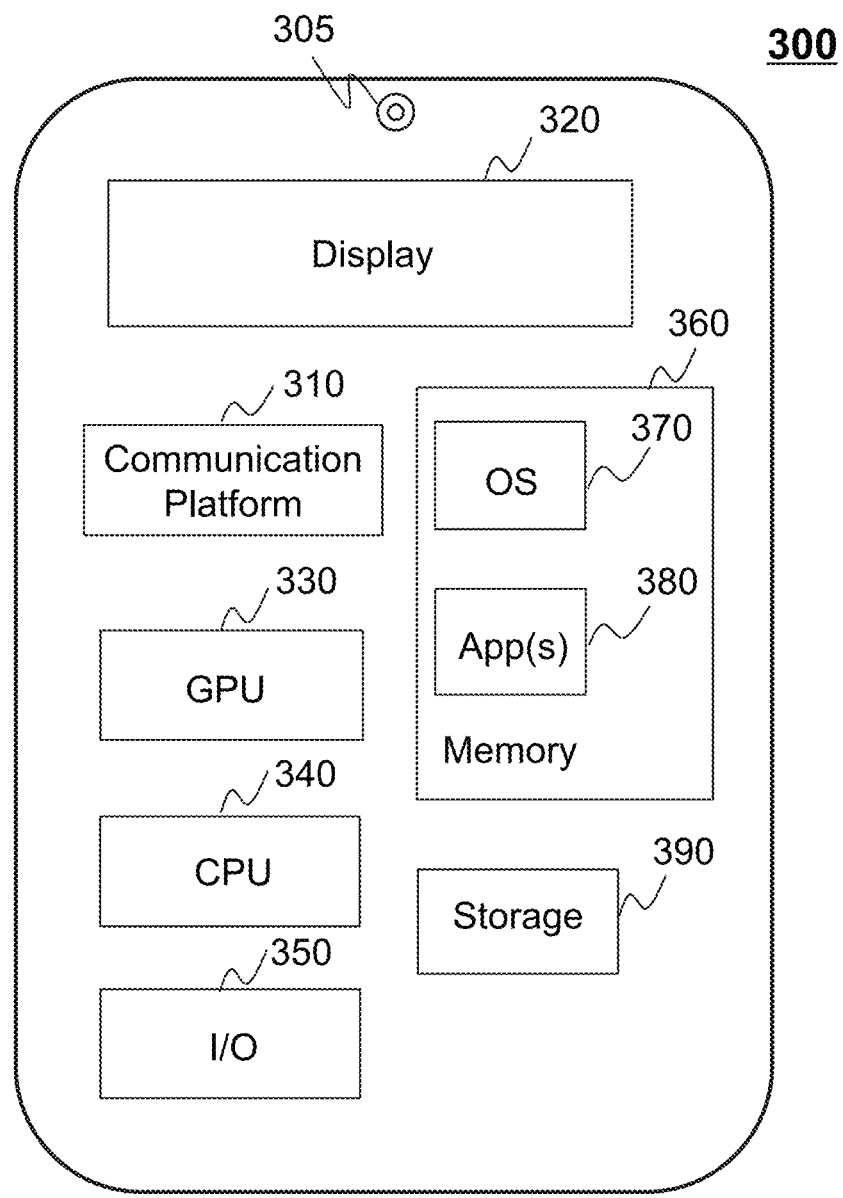
FIG. 3 is a schematic diagram illustrating exemplary hardware and/or software components of a mobile device on which a terminal may be implemented according to some embodiments of the present disclosure.

FIG. 3 is a schematic diagram illustrating exemplary hardware and/or software components of an exemplary mobile device on which a terminal may be implemented according to some embodiments of the present disclosure. As illustrated in FIG. 3, the mobile device 300 may include a camera 305, a communication platform 310, a display 320, a graphic processing unit (GPU) 330, a central processing unit (CPU) 340, an I/O 350, a memory 360, a mobile operating system (OS) 370, application (s) 380, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the online on-demand system 100. User interactions with the information stream may be achieved via the I/O 350 and provided to the database 130, the server 105 and/or other components of the online on-demand system 100. In some embodiments, the mobile device 300 may be an exemplary embodiment corresponding to the requester terminal 130 or the provider terminal 140.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
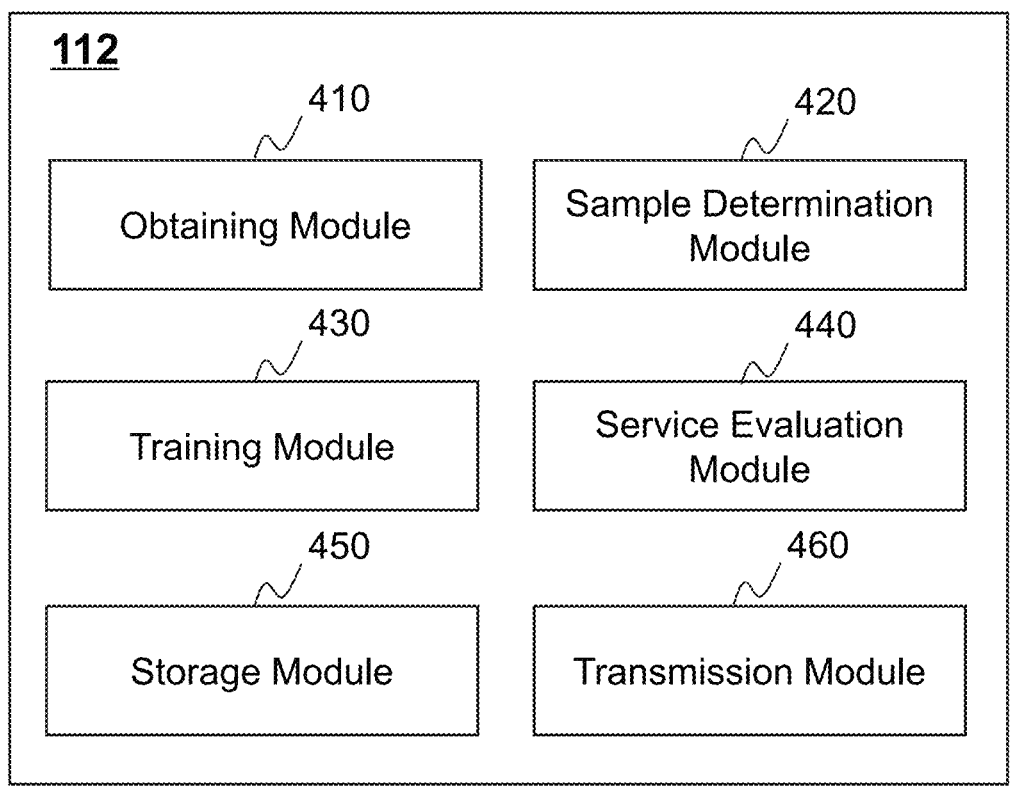
FIG. 4 is a block diagram illustrating exemplary processing engine according to some embodiments of the present disclosure.

FIG. 4 is a block diagram illustrating exemplary processing engine according to some embodiments of the present disclosure. In some embodiments, the processing engines 112 may be implemented on a computing device 200 (e.g., the processor 220) illustrated in FIG. 2 or a CPU 340 as illustrated in FIG. 3. As shown in FIG. 4, the processing engine 112 may include an obtaining module 410, a sample determination module 420, a training module 430, a service evaluation module 440, a storage module 450 and a transmission module 460.

The obtaining module 410 may be configured to obtain information related to one or more components of the online on-demand service system 100. For example, the obtaining module 410 may obtain a plurality of first groups of orders from a first time period for an on-demand service from the storage device 160 via the network 120 and/or a data exchange port. Each group of the plurality of first groups of orders may be associated with a service requester and a plurality of service providers, and the group of the plurality of first groups of orders may include one or more orders launched by the service requester and received by the plurality of service providers during the first time period. As another example, the obtaining module 410 may obtain one or more orders associated with a user from a mobile device (e.g., the provider terminal 140) associated with the user, the storage device 160, or any other components of the online on-demand service platform. The one or more orders associated with the user may be generated in a fourth time period subsequent to the first time period. As further another example, the obtaining module 410 may obtain a plurality of second groups of orders in a third time period, which is subsequent to the first time period, for updating the plurality of training samples.

The sample determination module 420 may be configured to determine a plurality of training samples for further determining feature weights for service evaluation. In some embodiments, the sample determination module 420 may a first behavior feature of the plurality of service providers and a second behavior feature of the service requester for each group of the plurality of first groups of orders. The first behavior feature of the plurality of service providers for a first group of orders may relate to one or more behaviors of the plurality of service providers. The second behavior feature of the service requester for a first group of orders may be defined by a change of behavior related to the on-demand service of the service requester in the first time period with respect to a second time period prior to the first time period. In some embodiments, the sample determination module 420 may classify each pair of first behavior feature and second behavior feature into a plurality of categories and determine the plurality of training samples based on the plurality of categories.

The training module 430 may be configured to determine feature weights for service evaluation using the plurality of training samples. The feature weights for service evaluation may indicate a contribution of different behavior features of a service provider to service evaluation of the service provider. In some embodiments, the training module 430 may train a neural network model using the plurality of training samples. The trained neural network model may include one or more optimized parameters. The training module 430 may designate the one or more optimized parameters as the feature weights for service evaluation. In some embodiments, the training module 430 may update the feature weights periodically, such as weekly, monthly, quarterly, etc., by updating the neural network model.

The service evaluation module 440 may be configured to determine a service score for the user based on the feature weights. In some embodiments, the service evaluation module 440 may determine the service score based on a third behavior feature of the user and the feature weights. The third behavior feature of the user may relate to one or more behaviors of the user taking place during the user performing the one or more orders associated with the user. For example, the third behavior feature of the user may be defined by the one or more behaviors of the user and a probability or (frequency) that each of the one or more behaviors takes place during the user performing the one or more orders as described elsewhere in the present disclosure. In some embodiments, the service evaluation module 440 may assess the service score based on historical orders associated with the user from a time period prior the fourth time period. assess the service score based on historical orders associated with the user from a time period prior the fourth time period. In some embodiments, the service evaluation module 440 may transmit one or more signals to a mobile device associated with the user. The signals may include the service score of the user, a query for whether the service score is acceptable, a summary of reasons of the service score, or the like, or any combination thereof.

The storage module 450 may be configured to store information generated by one or more components of the processing engine 112. For example, the storage module 450 may store the plurality of training samples determined by the sample determination module 420. As another example, the storage module 450 may store the feature weights for service evaluation determined by the training module 430. As further another example, the storage module 450 may store the service score determined by the service evaluation module 440.

The transmission module 460 (also referred to as a data exchange port) may establish a connection between the processing engine 112 and one or more components of the online on-demand service system 100. The connection may be a wired connection, a wireless connection, any other communication connection that can enable data transmission and/or reception, and/or any combination of these connections. For example, the obtaining module 410 may obtain the plurality of first groups of orders from the storage device 160 by the transmission module 460. As another example, the service evaluation module 440 may transmit one or more signals to the mobile device by the transmission module 460. As further another example, the service evaluation module 440 may receive signals including information of whether the user accepts the service score by the transmission module 460.

The modules may be hardware circuits of all or part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

It should be noted that the above description of the processing engine 112 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, any module mentioned above may be implemented in two or more separate units. For example, the functions of the sample determination module 420 may be implemented in two separate units, one of which is configured to determine the first behavior feature of the plurality of services providers and the second behavior feature of the service requester for each group of the plurality of first groups of orders, and the other is configured to determine the plurality of training samples. In some embodiments, the processing engine 112 may further include one or more additional modules (e.g., a storage module).

Figure 5:
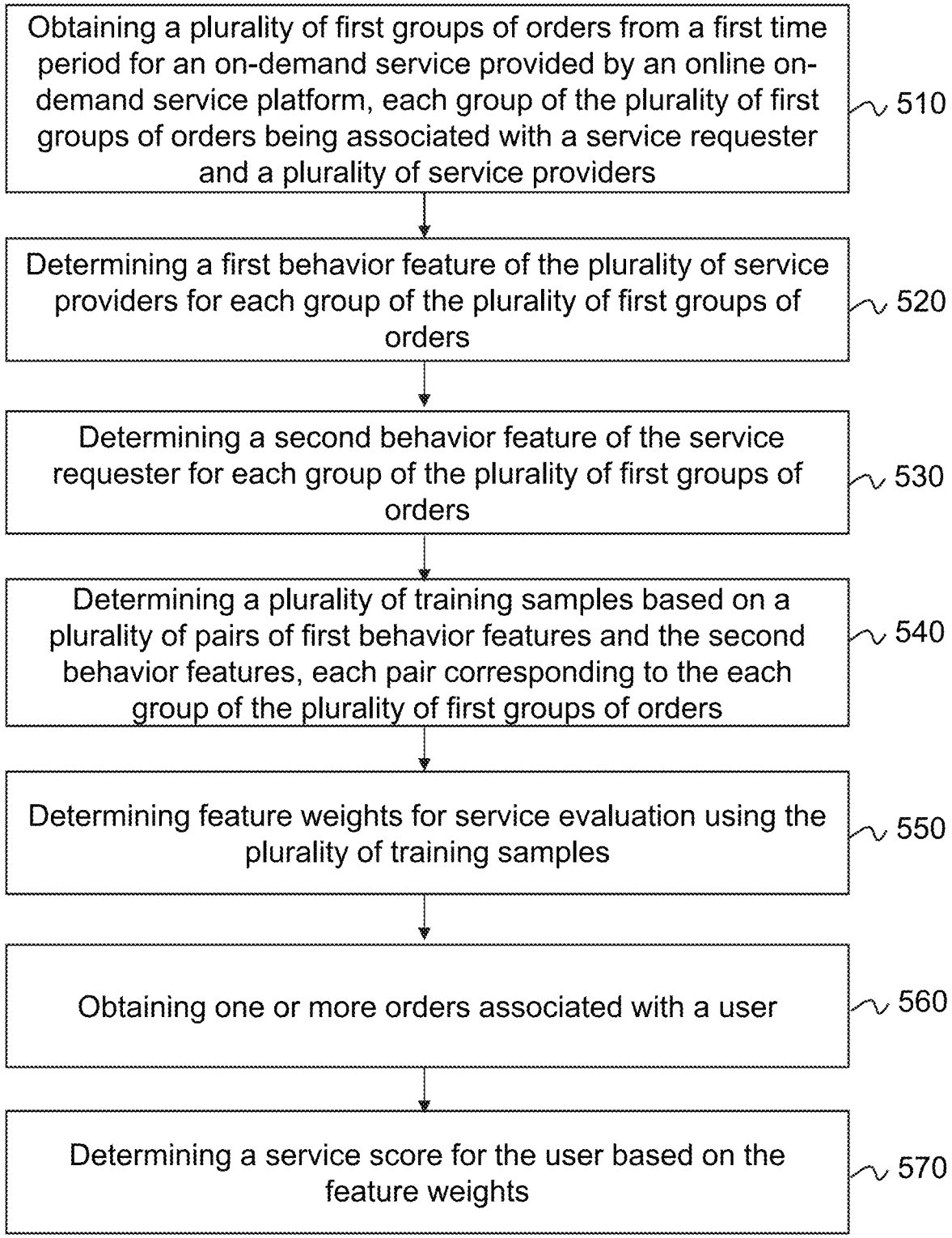
FIG. 5 is a flowchart illustrating an exemplary process for processing data from an online on-demand service platform according to some embodiments of the present disclosure.

FIG. 5 is a flowchart illustrating an exemplary process for processing data from an online on-demand service platform according to some embodiments of the present disclosure. At least a portion of process 500 may be implemented on the computing device 200 as illustrated in FIG. 2 or the mobile device 300 as illustrated in FIG. 3. In some embodiments, one or more operations of process 500 may be implemented in the online on-demand system 100 as illustrated in FIG. 1. In some embodiments, one or more operations in the process 500 may be stored in a storage device (e.g., the storage device 160, the ROM 230, the RAM 240, the storage 390) as a form of instructions, and invoked and/or executed by the server 110 (e.g., the processing engine 112 in the server 110, or the processor 220 of the computing device 200). In some embodiments, the instructions may be transmitted in a form of electronic current or electrical signals.

In 510, the processing engine 112 (e.g., the obtaining module 410) may obtain a plurality of first groups of orders from a first time period for an on-demand service provided by an online on-demand service platform (e.g., the online on-demand service system 100). Exemplary online on-demand services may include a taxi-hailing service, a chauffeur service, an express car service, a carpool service, a bus service, a driver-for-hire service, a shuttle service, a take-out service, or the like, or any combination thereof. In some embodiments, the online on-demand service may be any online to offline service, such as a meal booking service, an online shopping service, or the like, or any combination thereof.

Each group of the plurality of first groups of orders may be associated with a service requester and a plurality of service providers, and the group of the plurality of first groups of orders may include one or more orders launched by the service requester and received by the plurality of service providers during the first time period. The first time period may be a period right before the current time, for example, the past week, the past month, the past half of a year, or past last year. The one or more orders may be fulfilled or not by the plurality of service providers. In some embodiments, the plurality of first groups of orders may be obtained from one or more components of the online on-demand system 100. Merely by way of example, the plurality of first groups of orders may be stored in the storage device 160. The obtaining module 410 may retrieve the plurality of first groups of orders from the storage device 160 via the network 120 and/or a data exchange port. The data exchange port may establish a connection between the processing engine 112 and one or more other components in the online on-demand system 100, such as the storage device 160. The connection may be a wired connection, a wireless connection, any other communication connection that can enable data transmission and/or reception, and/or any combination of these connections. In some embodiments, the data exchange port may be similar to the COM 250 described in FIG. 2, and the descriptions thereof are not repeated here.

In some embodiments, the online on-demand service may be a transportation service. An order for the transportation service may be defined by one or more parameters relating to a trip associated with a service requester and a service provider. Exemplary parameters relating to the trip may include an estimated travel duration, an estimated time of arrival (ETA), an estimated trip route, an actual trip duration, an actual trip route, an actual time of arrival, a distance between the position of the service provider and the position of the service requester, time taken by the service provider for picking up the service requester (also referred to as pick-up time), an estimated fee of the order, an actual fee of the order, etc. In some embodiments, the service requester may evaluate, praise, and/or complain about the trip, the order, and/or the service provider to generate a user feedback associated with the order. In some embodiments, the user feedback associated with the order may include an evaluation, praise, and/or complaint relating one or more behaviors of the service provider during the service session (i.e. the duration the provider providing the transportation service). Exemplary one or more behaviors of the service provider during the service session may include that the service provider cancels the order, the service provider fulfills the order, the service provider keeps talking with the service requester during the trip, the service provider makes one or more calls during the trip, the service provider and/or a vehicle associated with the service provider has peculiar smell during the trip, the service provider makes a detour, the service provider does not arrive at the pick-up location according to an estimated pick-up time associated with the order, the service provider does not arrive at the destination associated with the order according to the ETA, the service provider does not drive the service requester to the destination, the service provider engages in a conflict (e.g., fight, quarrel, harass, etc.) with the service requester, the service provider does not keep the vehicle clean and neatly, the service provider violates a traffic regulation, etc. In some embodiments, the behaviors of the service provider during the service provider providing the transportation service may include that the service provider helps the service requester, the service provider is polite and professional, etc.

In some embodiments, the evaluation associated with the order may be positive or negative. For example, the evaluation associated with the order may include a favorable or satisfied review. As another example, the evaluation associated with the order may include a negative or dissatisfied review. In some embodiments, the evaluation associated with the order may be ranked into, for example, one-star, two-star, three-star, etc. In some embodiments, the one or more behaviors of the service provider during the service session may be obtained from the user feedback (e.g., the evaluation or complaint) generated by the service requester via a user interface of a client terminal (e.g., the requester terminal 130 or the provider terminal 140). In some embodiments, the one or more behaviors of the service provider may be determined based on the one or more trip parameters. For example, whether the service provider drives the service requester to the destination before the ETA may be determined based on the ETA associated with the order and an actual time of arrival.

In 520, the processing engine 112 (e.g., the sample determination module 420) may determine a first behavior feature of the plurality of service providers for each group of the plurality of first groups of orders. In some embodiments, the first behavior feature of the plurality of service providers for a first group of orders may relate to one or more behaviors of the plurality of service providers. For example, the first behavior feature of the plurality of service providers for a first group of orders may be defined by the one or more behaviors of the plurality of service providers and a probability (or frequency) that each of one or more behaviors may take place. As used herein, the probability (or frequency) that a specific behavior may be defined by a ratio of the times that the specific behavior takes place to the total times that all behaviors of the plurality of service providers take place during the plurality of service providers performing the first group of orders. In some embodiments, the first behavior feature of the plurality of service providers for a first group of orders may be defined by one or more evaluations associated with the first group of orders and a probability (or frequency) that each evaluation of the one or more evaluations takes place. As used herein, the probability (or frequency) that a specific evaluation associated with a first group of orders may be defined by a ratio of the times that the specific evaluation associated with the first group of orders takes place to the total times that all evaluations take place during the plurality of service providers performing the first group of orders.

For a first group of orders, the first behavior feature of the plurality of service providers may be determined based on the behavior features of the plurality of service providers. For example, the processing engine 112 may obtain one or more behaviors of the plurality of service providers during the plurality of service providers performing the first group of orders. The processing engine 112 may also count the total times that the one or more behaviors take place and the times that each of the one or more behaviors takes place. The processing engine 112 may determine the total times that the one or more behaviors take place and the times that each of the one or more behaviors takes place. In some embodiments, the first behavior feature may be expressed by an N-dimension feature vector including a plurality of elements. For example, the first behavior feature may be denoted by $x^m$ denoted by, for example, $[x_1^m, x_2^m, \ldots, x_n^m]$, wherein m refers to the service requester, n refers to a specific behavior of the plurality of service providers, and $x_n^m$ refers to the probability or (frequency) that a specific behavior n of the plurality of service providers takes place.

In 530, the processing engine 112 (e.g., the sample determination module 420) may determine a second behavior feature of the service requester for each group of the plurality of first groups of orders. As used herein, the second behavior feature of the service requester for a first group of orders may be defined by a change of behavior related to the on-demand service of the service requester in the first time period with respect to a second time period prior to the first time period. The behavior related to the on-demand service of the service requester may include an order quantity, a total order fee, an average order fee, etc., in a time period, for example, a week, a month, a quarter, a year, etc. As used herein, the order quantity may refer to the total number of orders resulted from the requests by the service requester for the on-demand service in the time period. The total order fee may refer to the total fee of orders requested by the service requester for the on-demand service in the time period. The average order fee may refer to the average fee of each order requested by the service requester for the on-demand service in the time period. The second behavior feature of the service requester for a first group may include at least one of the change of the order quantity associated with the service requester in the first time period with respect to that in the second time period, the change of the total order fee associated with the service requester in the first time period with respect to that in the second time period, or the change of the average order fee associated with the service requester in the first time period with respect to that in the second time period etc.

In some embodiments, the change of behavior related to the on-demand service of the service requester (i.e., the second behavior feature) may be positive or negative. If the change of behavior related to the service requester exceeds 0, the processing engine 112 may determine that the change of behavior related to the service requester is positive. If the change of behavior related to the service requester is less than 0, the processing engine 112 may determine that the change of behavior related to the service requester is negative. For example, when the order quantity associated with the service requester is 300 in the first time period and the order quantity associated with the service requester is 250 in the second time period, the change of the order quantity associated with the service requester is positive. As another example, when the total order fee associated with the service requester is 1000 dollars in the first time period and the order fee associated with the service requester is 1500 dollars in the second time period, the change of the total fee of orders associated with the service requester is negative.

In some embodiments, the change of behavior related to the on-demand service (i.e., the second behavior feature) of the service requester may be denoted by a ratio of the change of the order quantity, total order fee, or average order fee to the total order quantity, total order fee, or average order fee associated with the service requester in the second time period, respectively. The greater the absolute value of the ratio is, the more intense the change of behavior related to the on-demand service of the service requester may be, which means that the behavior related to the on-demand service of the service requester may be influenced by some factors, such as the behavior of the plurality of service providers.

In some embodiments, the second behavior feature may be denoted $y^m$. The second behavior feature may be determined according to Equation (1) as illustrated below:

$$y^m = \frac{n_2 - n_1}{n_1}, \quad (1)$$

wherein m refers to the $m^{th}$ service requester, $n_1$ refers to the value of a behavior (e.g., the total number of orders, the total fee of orders, or the average order fee associated with the service requester) related to the service requester in the second time period, and $n_2$ refers to the value of a behavior (e.g., the total number of order, the total fee of orders, or the average order fee associated with the service requester) related to the service requester in the first time period. When $n_2 < n_1$, the second behavior feature $y^m$ may be negative. Alternatively or additionally, when $n_2 > n_1$, the second behavior feature $y^m$ may be positive.

In 540, the processing engine 112 (e.g., the sample determination module 420) may determine a plurality of training samples based on a plurality of pairs of first behavior features and the second behavior features, each pair corresponding to the each group of the plurality of first groups of orders. For the each group of the plurality of first groups of orders, the second behavior feature of the service requester may correspond to a first behavior feature of the plurality of service providers. In some embodiments, the sample determination module 420 may classify each pair of first behavior feature and second behavior feature into a plurality of categories, for example, by using a clustering algorithm. Exemplary clustering algorithms may include a prototype-based clustering algorithm (e.g., a K-means algorithm), a density-based clustering algorithm (e.g., a Density-Based Spatial Clustering of Applications with Noise (DBSCAN) algorithm), a hierarchical clustering algorithm (e.g., Agglomerative NESting (AGNES) algorithm), etc. Each of the plurality of categories may include one or more pairs of first behavior features and second behavior features. The sample determination module 420 may determine the plurality of training samples based on the plurality of categories. In some embodiments, the sample determination module 420 may determine one or more pairs of first behavior features and second behavior features from a category. The sample determination module 420 may further determine one of the plurality of training samples based on the one or more pairs of first behavior features and second behavior features. For example, the sample determination module 420 may determine one single pair of first behavior feature and second behavior feature whose second behavior feature is maximum or minimum from the category as one of the plurality of training samples.

In some embodiments, the sample determination module 420 may determine the average of first behavior features (i.e., average first behavior feature) and the average of second behavior features (i.e., average second behavior feature) from a category. The sample determination module 420 may further determine one of the plurality of training samples based on the average first behavior feature and the average of second behavior feature in the category. For example, the sample determination module 420 may designate the average first behavior feature and the average of second behavior feature in the category as one of the plurality of training samples. As another example, the sample determination module 420 may determine a portion of the plurality of categories whose average second behavior features satisfy a condition as the plurality of training samples. Details of determining the plurality of training samples may be found elsewhere of the present disclosure, e.g., in FIG. 6 and the descriptions thereof.

In 550, the processing engine 112 (e.g., the training module 430) may determine feature weights for service evaluation using the plurality of training samples. As used herein, the feature weights for service evaluation may indicate a contribution of different behavior features of a service provider to service evaluation of the service provider. A behavior feature with a greater feature weight may have a greater contribution than a behavior feature with a lower weight to service evaluation of the service provider. In some embodiments, the service evaluation of the service provider may be denoted by a service score. The service score may indicate a service quality of a service provider. The greater the service score of a service provider is, the better the service quality of the service provider may be. In some embodiments, the service score may be in a range, for example, from 0 to 100, or from 0 to 10, or from -100 to 100, or from -10 to 10, etc.

In some embodiments, the training module 430 may determine the feature weights for service evaluation by training a neural network model using the plurality of training samples. Exemplary neural network models may include a feed-forward neural network model, a radial basis function (RBF) neural network model, a Kohonen self-organizing neural network model, a recurrent neural network (RNN) model, a convolutional neural network (CNN)

model, a modular neural network model, etc. In some embodiments, the neural network model may include multiple layers, for example, an input layer, multiple hidden layers, and an output layer. The multiple hidden layers may include one or more convolutional layers, one or more batch normalization layers, one or more activation layers, a fully connected layer, a cost function layer, etc. Each of the multiple layers may include a plurality of nodes. The one or more activation layers may be configured with an activation function. The activation function may be used by the activation layers (e.g., Rectified Linear Units layer) to constrain an output of the activation layers. Exemplary activation functions may include a linear function, a ramp function, a threshold function, a Sigmoid function, etc. The cost function layer or output layer may be configured with a cost function (i.e., loss function (or training loss)). The cost function may be used to assess a difference between a testing value and a desired value of the neural network model. The regularization may be configured to measure the complexity of the neural network model, for example, L2 regularization may avoid overfitting of the trained model.

In some embodiments, the neural network model may be defined by a plurality of parameters. Exemplary parameters of the neural network model may include the size of a convolutional kernel, the number of layers, the number of nodes in each layer, a connected weight between two connected nodes, a bias vector relating to a node, etc. The connected weight between two connected nodes may be configured to represent a proportion of an output value of a node to be as an input value of another connected node. The bias vector relating to a node may be configured to control an output value of the node deviating from an origin. The parameters of the neural network model may have default settings (e.g., one or more preliminary parameters) of the online on-demand system 100 or be adjustable in different situations. For example, the training module 430 may designate the feature weights for service evaluation as the connected weights between two connected nodes of the neural network model. The training module 430 may train the neural network model using the plurality of training samples to update and/or adjust the parameters of the neural network model based on a neural network training algorithm. Exemplary neural network training algorithm may include a gradient descent algorithm, a Newton's algorithm, a Quasi-Newton algorithm, a Levenberg-Marquardt algorithm, a conjugate gradient algorithm, or the like, or a combination thereof. In some embodiments, the neural network model may be trained by performing a plurality of iterations. Before the plurality of iterations, the parameters of the neural network model may be initialized. For example, the connected weights (i.e., the feature weights for service evaluation) of the neural network model may be initialized to be random values in a range based on for example, a Gaussian random algorithm, a Xavier algorithm, etc. Then the plurality of iterations may be performed to update the parameters of the neural network model until a condition is satisfied. The condition may provide an indication of whether the neural network model is sufficiently trained. For example, the condition may be satisfied if the value of the cost function associated with the neural network model is minimal or smaller than a threshold (e.g., a constant). As another example, the condition may be satisfied if the value of the cost function converges. The convergence may be deemed to have occurred if the variation of the values of the cost function in two or more consecutive iterations is smaller than a threshold (e.g., a constant). As still an example, the condition may be satisfied when a specified number of iterations are performed in the training process.

For each of the plurality of iterations, a training sample including a first behavior feature and a second behavior feature may be inputted into the neural network model. The first behavior feature may be processed by one or more layers of the neural network model to generate an estimated second behavior feature. The estimated second behavior feature may be compared with the second behavior feature (also referred to a reference second behavior feature) in the training sample based on the cost function of the neural network model. The cost function of the neural network model may be configured to assess a difference between the estimated second behavior feature of the neural network model and the reference second behavior feature. If the value of the cost function exceeds a threshold in a current iteration, the parameters of the neural network model may be adjusted and updated to cause the value of the cost function corresponding to the first behavior feature (i.e., the difference between the estimated second behavior feature and the reference second behavior feature) smaller than the threshold. Accordingly, in a next iteration, another training sample may be inputted into the neural network model to train the neural network model to update the parameters of the neural network model as described above until the condition is satisfied. The trained neural network model may include one or more optimized and/or updated parameters. The training model 430 may designate the one or more optimized parameters as the feature weights for service evaluation.

In some embodiments, the feature weights may be updated according to an instruction generated by an operator or a default setting of the online on-demand service system 100. For example, the processing engine 112 may update the feature weights periodically, such as weekly, monthly, quarterly, etc. The processing engine 112 may update the feature weights by updating the plurality of training samples. For example, the processing engine 112 may obtain a plurality of second groups of orders provided by the online on-demand service platform in a third time period, which is subsequent to the first time period. The processing engine 112 may update the plurality of training samples based on the plurality of second groups of orders in the third time period. The processing engine 112 may further train the neural network model or the trained neural network model using the plurality of updated training samples to update the feature weights.

In 560, the processing engine 112 (e.g., the obtaining module 410) may obtain one or more orders associated with a user. The user may be a service provider of the online on-demand service. The one or more orders associated with the user may be generated in a fourth time period subsequent to the first time period. For example, if the first time period is the second quarter, the fourth time period may be the third quarter. In some embodiments, the processing engine 112 (e.g., the obtaining module 410) may obtain the one or more orders from a mobile device (e.g., the provider terminal 140) associated with the user, the storage device 160, or the online on-demand service platform, etc. The obtaining module 410 may obtain one or more orders associated with the user according to an instruction of the user or a default setting of the online on-demand system 100. For example, the user may generate a request or instruction for updating the service score via the mobile device (e.g., a user interface). Then the obtaining module 410 may obtain the one or more orders associated with the user from the third time period for service evaluation. As another example, the obtaining module 410 may obtain the one or more orders associated with the user periodically, for example, monthly, quarterly, etc.

In 570, the processing engine 112 (e.g., the service evaluation module 440) may determine a service score for the user based on the feature weights. The service evaluation module 440 may determine the service score based on a third behavior feature of the user and the feature weights. The third behavior feature of the user may relate to one or more behaviors of the user taking place during the user performing the one or more orders. In some embodiments, the third behavior feature of the user may be defined by the one or more behaviors of the user and a probability (or frequency) that each of the one or more behaviors happens during the user performing the one or more orders as described elsewhere in the present disclosure. In some embodiments, the service evaluation module 440 may identify a third behavior feature of the user from the one or more orders. For example, the processing engine 112 may obtain one or more behaviors of the user taking place during the user performing each of the one or more orders. The processing engine 112 may further count the total times that the one or more behaviors take place and the times that each of the one or more behaviors takes place. The processing engine 112 may determine the third behavior feature based on a ratio of the times that each of the one or more behaviors takes place to the total times that the one or more behaviors take place.

In some embodiments, the service evaluation module 440 may determine a product of the probability (or frequency) of each of the one or more behaviors and a corresponding feature weight. Then the service evaluation module 440 may determine the sum of the product of the probability (or frequency) of each of the one or more behaviors and the corresponding feature weight as the service score. For example, the third behavior feature may be denoted by a first vector, for example, $[x_1, x_2, \ldots, x_n]$, wherein n refers to a behavior of the user related to the one or more orders, and $x_n$ refers to the probability (or frequency) of the behavior n. The feature weights may be denoted by a second vector, for example, $[w_1, w_2, \ldots, w_n]$, The service evaluation module 440 may determine the service score by performing a point product operation between the first vector and the second vector. Further, the service score may be equal to $(x_1 \cdot w_1 + x_2 \cdot w_2 +, \ldots, + x_n \cdot w_n)$.

In some embodiments, the service evaluation module 440 may transmit one or more signals to the mobile device. The signals may include the service score of the user. The signals may also be configured to cause the mobile device to display the service score to the user. In some embodiments, the signals may include a query for inquiring whether the service score is acceptable for the user. If the user accepts the service score, the user may input an instruction via the mobile device indicating that the service score is acceptable. The mobile device may transmit the instruction indicating that the service score is acceptable to the service evaluation module 440. The service evaluation module 440 may update a previous service score of the user by the service score in response to the instruction indicating that the service score is acceptable. If the user does not accept the service score, the user may input an instruction via the mobile device indicating that the service score is not acceptable. In addition, the instruction from the user may also include an inquiry from the user for the reasons for the service score. The mobile device may transmit the instruction indicating that the service score is not acceptable, as well as the inquiry from the user, to the service evaluation module 440. In some embodiments, the service evaluation module 440 may respond to the user's inquiry, via the user interface, by providing a summary for the reasons of the service score.

In some embodiments, the service evaluation module 440 may assess the service score based on historical orders associated with the user from a time period prior the fourth time period. For example, the service evaluation module 440 may compare the third behavior feature with a reference behavior feature identified from the historical orders. If the difference between the third behavior feature and the reference behavior feature is less than a threshold, the service evaluation module 440 may not update the previous service score of the user by the service score and transmit the previous service score to the mobile device. If the difference between the third behavior feature and the reference behavior feature exceeds the threshold, the service evaluation module 440 may update the previous service score of the user by the service score and transmit the service score to the mobile device again.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 560 and operation 570 may be omitted. As another example, operation 520 and operation 530 may be performed simultaneously.

FIG. 6 is a flowchart illustrating an exemplary process for determining a plurality of training samples according to some embodiments of the present disclosure. At least a portion of process 600 may be implemented on the computing device 200 as illustrated in FIG. 2 or the mobile device 300 as illustrated in FIG. 3. In some embodiments, one or more operations of process 600 may be implemented in the online on-demand system 100 as illustrated in FIG. 1. In some embodiments, one or more operations in the process 600 may be stored in a storage device (e.g., the storage device 160, the ROM 230, the RAM 240, the storage 390, etc.) as a form of instructions, and invoked and/or executed by the server 110 (e.g., the processing engine 112 in the server 110, or the processor 220 of the computing device 200). In some embodiments, operation 540 as described in connection with FIG. 5 may be performed according to process 600 as illustrated in FIG. 6.

In 610, the processing engine 112 (e.g., the sample determination module 420) may classify a plurality of pairs of first behavior features and second behavior features into a plurality of categories. Each pair may include a first behavior feature and a corresponding second behavior feature corresponding to each group of the plurality of first groups of orders. A pair of first behavior feature and second behavior feature may be determined as described in FIG. 5. Each of the plurality of categories may include one or more pairs of first behavior features and second behavior features.

In some embodiments, the sample determination module 420 may cluster the plurality of pairs of first behavior features and second behavior features into a plurality of clusters, also referred to as the plurality of categories, using a clustering algorithm as described elsewhere in the present disclosure (e.g., FIG. 5 and the descriptions thereof). The sample determination module 420 may cluster the plurality of pairs of first behavior features and second behavior features based on a similarity between first behavior features in different pairs. The similarity between two first behavior features may be represented by the distance between the two first behavior features. The smaller the distance is, the higher the similarity may be. Exemplary distances for representing a similarity may include a Minkowski distance, a Euclidean distance, a Manhattan distance, a Chebyshev distance, etc. For example, the sample determination module 420 may cluster two or more pairs of first behavior features and second behavior features into a same category if the similarity between the first behavior features of the two or more pairs satisfy a criterion, such as greater than a similarity threshold.

As another example, using the K-means algorithm, the plurality of pairs of first behavior features and second behavior features may be classified into a first part and a second part. Each pair in the first part of the plurality of pairs of first behavior features and second behavior features may be classified into one of the plurality of categories (i.e., K clusters). The value of K (i.e., the number of the plurality of categories) may be predetermined in the online on-demand system 100. For example, the value of K may be equal to the half of the total number of the plurality of pairs. Then the sample determination module 420 may classify each pair in the second part to a target cluster. The target cluster for a specific pair in the second part may be determined based on a similarity between a first behavior feature of a pair in the first part belong to the target cluster and a first behavior feature of the specific pair in the second part. For example, the first behavior feature of the pair in the first part belong to the target cluster may have a minimum distance with the first behavior feature of the specific pair in the second part.

In 620, the processing engine 112 (e.g., the sample determination module 420) may determine an average first behavior feature based on first behavior features in each of the plurality of categories for the each of the plurality of categories. In some embodiments, the first behavior feature of a pair may be denoted by a vector including a plurality of elements, for example, $[x_1^1, x_2^1, \ldots, x_n^1]$. The average first behavior feature associate with a category may be determined by averaging the plurality of elements of the first behavior feature in each pair of the category. For example, if the category includes three pairs of first behavior features and second behavior features expressed as $([x_1^1, x_2^1, \ldots, x_n^1], y^1)$, $([x_1^2, x_2^2, \ldots, x_n^2], y^2)$, and $([x_1^3, x_2^3, \ldots, x_n^3], y^3)$, the average first behavior feature of the category may be determined as $[(x_1^1+x_1^2+x_1^3)/3, (x_2^1+x_2^2+x_2^3)/3, \ldots, (x_n^1+x_n^2+x_n^3)/3]$.

In 630, the processing engine 112 (e.g., the sample determination module 420) may determine an average second behavior feature based on second behavior features in each of the plurality of categories for the each of the plurality of categories. In some embodiments, the average second behavior feature associated with a category may be determined by averaging the second behavior feature in each pair of the category. For example, if the category includes three pairs of first behavior features and second behavior features expressed as $([x_1^1, x_2^1, \ldots, x_n^1], y^1)$, $([x_1^2, x_2^2, \ldots, x_n^2], y^2)$, and $([x_1^3, x_2^3, \ldots, x_n^3], y^3)$, the average second behavior feature of the category may be determined as $(y^1+y^2+y^3)/3$.

In 640, the processing engine 112 (e.g., the sample determination module 420) may determine a plurality of training samples based on the average first behavior feature and the average second behavior feature associated with the each of the plurality of categories. In some embodiments, the sample determination module 420 may determine the average first behavior feature and the average second behavior feature associated with the each of the plurality of categories as the plurality of training samples. Each of the plurality of training samples may include a pair of average first behavior feature and average second behavior feature associated with one of the plurality of categories. For example, the average first behavior feature and the average second behavior feature associated with each of the plurality of categories may be expressed respectively as $(X^1, Y^1)$, $(X^2, Y^2)$, $(X^3, Y^3)$, ..., $(X^K, Y^K)$, wherein $X^K$ represents the average first feature of Kth category, and $Y^K$ represents the average second feature of Kth category. $(X^1, Y^1)$, $(X^2, Y^2)$, $(X^3, Y^3)$, ..., $(X^K, Y^K)$ may be designated as the plurality of training samples.

In some embodiments, the sample determination module 420 may determine a portion of the plurality of categories as the plurality of training samples based on the average second behavior associated with the each of the plurality of categories. In some embodiments, the average second behavior associated with each of the portion of the plurality of categories may satisfy a condition. For example, if the average second behavior associated with a specific category is greater than a first threshold or less than a second threshold, the sample determination module 420 may determine the average first behavior feature and the average second behavior associated with the specific category as one of the training samples. The first threshold and/or the second threshold may be set by an operator or according to a default setting of the online on-demand service system 100. As another example, the sample determination module 420 may rank the average second feature associated with each of the plurality of categories in ascending or descending. The sample determination module 420 may determine the portion of the plurality of categories as the plurality of training samples whose average second behavior features rank in a top range, e.g., top 10%, top 20%, top 30%, etc., and/or a bottom range, e.g., bottom 10%, bottom 20%, bottom 30%, etc. In some embodiments, the sample determination module 420 may designate average first behavior features and average second behavior features associated with the portion of the plurality of categories as the plurality of training samples. In some embodiments, the sample determination module 420 may designate one or more pairs of first behavior features and second behavior features in each of the portion of the plurality of categories as the plurality of training samples.

As a further example, the average second behavior feature associated with the each of the plurality of categories may be ranked in a descending manner. The portion of the plurality of categories may include categories with average second behavior features ranked in the top 20% and the bottom 20%. A pair of average first behavior feature and average second behavior feature associated with a category with the average second behavior feature ranked in the top 20% may also be referred to as a positive training sample. A pair of average first behavior feature and average second behavior feature associated with a category with the average second behavior feature ranked in the bottom 20% may also be referred to as a negative training sample.

According to some embodiments of the present disclosure, the plurality of pairs of first behavior features and second behavior features may be clustered into a plurality of categories. The plurality of training samples may be determined based on the average first behavior feature and the average second behavior feature associated with each of the plurality of categories, which may decrease the data quantity for processing. Further, the plurality of training samples may be determined by ranking the average second behavior feature associated with the each of the plurality of categories. A plurality of pairs of average first behavior features and average second behavior features associated with the portion of the plurality of categories whose average second behavior features rank in the top part and/or bottom part may be designated as the plurality of training samples, which may decrease noise level of the training samples.

It should be noted that the above description of the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, 620 and 630 may be combined in one operation. As another example, the operation 620 may be omitted. After the sample determination module 420 determines the average second behavior feature based on second behavior features in the each of the plurality of categories for the each of the plurality of categories, the sample determination module 420 may determine the portion of the plurality of categories based on the ranked second behavior feature. The sample determination module 420 may further designate pairs of first behavior feature and second behavior feature included in the portion of the plurality of categories as the plurality of training samples.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for processing data from an online on-demand service platform, comprising:
   at least one storage medium including a set of instructions;
   at least one processor in communication with the at least one storage medium, wherein when executing the set of instructions, the at least one processor is directed to cause the system to:
      obtain a plurality of first groups of orders from a first time period for an on-demand service provided by the online on-demand service platform, each group of the plurality of first groups of orders being associated with a service requester and a plurality of service providers;
      for the each group of the plurality of first groups of orders,
         determine a first behavior feature of the plurality of service providers; and
         determine a second behavior feature of the service requester, wherein the second behavior feature is defined by a change of behavior related to the on-demand service of the service requester in the first time period with respect to a second time period prior to the first time period;
      classify a plurality of pairs of first behavior features and second behavior features into a plurality of categories, each pair corresponding to the each group of the plurality of first groups of orders;
      determine an average second behavior feature based on a second behavior feature in each of the plurality of categories;
      determine a portion of the plurality of categories based on the average second behavior feature associated with each of the plurality of categories, the average second behavior feature associated with each of the plurality of categories in the portion satisfying a condition;
      determine a plurality of training samples based on the portion of the plurality of categories; and
      determine feature weights for service evaluation using the plurality of training samples.

2. The system of claim 1, wherein to determine feature weights for service evaluation, the at least one processor is directed to cause the system to train a neural network model with the training samples.

3. The system of claim 1, wherein the second behavior feature of the service requester includes at least one of a change of an order quantity associated with the service requester in the first time period with respect to that in the second time period or a change of an order fee associated with the service requester in the first time period with respect to that in the second time period.

4. The system of claim 1, wherein the at least one processor is further directed to cause the system to:
   classify the plurality of pairs of first behavior features and second behavior features into the plurality of categories according to a cluster algorithm.

5. The system of claim 1, wherein to determine the plurality of training samples based on the portion of plurality of categories, the at least one processor is directed to cause the system to:
   for each of the plurality of categories in the portion,
      determine an average first behavior feature based on the first behavior feature in the each of the plurality of categories in the portion; and
      determine the average first behavior feature and the average second behavior feature associated with the each of the plurality of categories in the portion as the plurality of training samples.

6. The system of claim 1, wherein the condition includes that the average second behavior feature associated with each of the plurality of categories in the portion is greater than a first threshold or less than a second threshold.

7. The system of claim 6, wherein to determine the portion of the plurality of categories based on the average second behavior feature associated with each of the plurality of categories, the at least one processor is further directed to cause the system to:
   rank the average second behavior feature associated with the each of the plurality of categories; and
   determine the portion of the plurality of categories based on the ranked average second behavior feature associated with the each of the plurality of categories.

8. The system of claim 1, wherein the at least one processor is further directed to cause the system to:
   obtain a plurality of second groups of orders provided by the online on-demand service platform in a third time period, which is subsequent to the first time period;
   update the plurality of training samples based on the plurality of second groups of orders in the third time period; and
   update the feature weights using the updated plurality of training samples.

9. The system of claim 1, wherein the at least one processor is further directed to cause the system to:
   obtain one or more orders associated with a user from the mobile device;
   identify a third behavior feature of the user based on the one or more orders; and
   determine a service score for the user based on the feature weights and the third behavior feature.

10. The system of claim 9, wherein the at least one processor is further directed to cause the system to:
    transmit signals to the mobile device, wherein the signals include the service score and are configured to cause the mobile device to display the service score.

11. A method for processing data from an online on-demand service platform, comprising:
    obtaining a plurality of first groups of orders from a first time period for an on-demand service provided by the online on-demand service platform, each group of the plurality of first groups of orders being associated with a service requester and a plurality of service providers;
    for the each group of the plurality of first groups of orders,
       determining a first behavior feature of the plurality of service providers; and
       determining a second behavior feature of the service requester, wherein the second behavior feature is defined by a change of behavior related to the on-demand service of the service requester in the first time period with respect to a second time period prior to the first time period;
    classify a plurality of pairs of first behavior features and second behavior features into a plurality of categories, each pair corresponding to the each group of the plurality of first groups of orders;
    determine an average second behavior feature based on a second behavior feature in each of the plurality of categories;
    determine a portion of the plurality of categories based on the average second behavior feature associated with each of the plurality of categories, the average second behavior feature associated with each of the plurality of categories in the portion satisfying a condition;

determine a plurality of training samples based on the portion of the plurality of categories; and determining feature weights for service evaluation using the plurality of training samples.

12. The method of claim 11, wherein the determining feature weights for service evaluation includes training a neural network model with the training samples.

13. The method of claim 11, wherein the second behavior feature of the service requester includes at least one of a change of an order quantity associated with the service requester in the first time period with respect to that in the second time period or a change of an order fee associated with the service requester in the first time period with respect to that in the second time period.

14. The method of claim 11, wherein the method further includes:

classifying the plurality of pairs of first behavior features and second behavior features into the plurality of categories according to a cluster algorithm.

15. The method of claim 11, wherein the determining the portion of the plurality of training samples based on the plurality of categories includes:

for each of the plurality of categories in the portion,
determining an average first behavior feature based on the first behavior feature in the each of the plurality of categories in the portion;

determining the average first behavior feature and the average second behavior feature associated with the each of the plurality of categories in the portion as the plurality of training samples.

16. The method of claim 11, wherein the condition includes that the average second behavior feature associated with each of the plurality of categories in the portion is greater than a first threshold or less than a second threshold.

17. The method of claim 16, wherein the determining the portion of the plurality of categories based on the average second behavior feature associated with each of the plurality of categories includes:

ranking the average second behavior feature associated with the each of the plurality of categories; and determining the portion of the plurality of categories based on the ranked average second behavior feature associated with the each of the plurality of categories.

18. The method of claim 11, wherein the method further comprises:

obtaining a plurality of second groups of orders provided by the online on-demand service platform in a third time period, which is subsequent to the first time period;

updating the plurality of training samples based on the plurality of second groups of orders in the third time period; and updating the feature weights using the updated plurality of training samples.

19. The method of claim 11, wherein the method further comprises:

obtaining one or more orders associated with the user from the mobile device;

identifying a third behavior feature of the user based on the one or more orders; and determining a service score for the user based on the feature weights and the third behavior feature.

20. A non-transitory computer-readable storage medium embodying a computer program product, the computer program product comprising instructions configured to cause a computing device to:

obtain a plurality of first groups of orders from a first time period for an on-demand service provided by the online on-demand service platform, each group of the plurality of first groups of orders being associated with a service requester and a plurality of service providers;

for the each group of the plurality of first groups of orders,
determine a first behavior feature of the plurality of service providers; and determine a second behavior feature of the service requester, wherein the second behavior feature is defined by a change of behavior related to the on-demand service of the service requester in the first time period with respect to a second time period prior to the first time period;

classify a plurality of pairs of first behavior features and second behavior features into a plurality of categories, each pair corresponding to the each group of the plurality of first groups of orders;

determine an average second behavior feature based on a second behavior feature in each of the plurality of categories;

determine a portion of the plurality of categories based on the average second behavior feature associated with each of the plurality of categories, the average second behavior feature associated with each of the plurality of categories in the portion satisfying a condition;

determine a plurality of training samples based on the portion of the plurality of categories; and determine feature weights for service evaluation using the plurality of training samples.

* * * * *